(12) United States Patent
Wang et al.

(10) Patent No.: US 7,304,770 B2
(45) Date of Patent: Dec. 4, 2007

(54) REDUCTION OF DIFFERENTIAL GLOSS WITH HALFTONED CLEAR TONER

(75) Inventors: Shen-Ge Wang, Fairport, NY (US);
Chu-Heng Liu, Penfield, NY (US);
Beilei Xu, Penfield, NY (US)

(73) Assignee: Xerox Corporation, Stamford, CT (US)

(*) Notice: Subject to any disclaimer, the term of this patent is extended or adjusted under 35 U.S.C. 154(b) by 703 days.

(21) Appl. No.: 10/929,811

(22) Filed: Aug. 30, 2004

(65) Prior Publication Data

US 2006/0044617 A1    Mar. 2, 2006

(51) Int. Cl.
*H04N 1/405* (2006.01)
*B41M 3/10* (2006.01)

(52) U.S. Cl. .............. 358/3.06; 358/3.2; 358/3.28

(58) Field of Classification Search .......... 358/1.9, 358/3.06, 3.13–3.2, 3.26–3.28, 533–536; 382/237, 270; 428/195.1; 399/341–342
See application file for complete search history.

(56) References Cited

U.S. PATENT DOCUMENTS

| | | | | |
|---|---|---|---|---|
| 3,317,317 | A | 5/1967 | Clark | 96/1.4 |
| 3,784,289 | A * | 1/1974 | Wicker | 283/93 |
| 4,149,194 | A * | 4/1979 | Holladay | 358/3.16 |
| 4,210,346 | A | 7/1980 | Mowry, Jr. et al. | 283/8 B |
| 4,310,180 | A | 1/1982 | Mowry, Jr. et al. | 283/8 B |

(Continued)

FOREIGN PATENT DOCUMENTS

EP    0 859 506 A1    8/1998

(Continued)

OTHER PUBLICATIONS

Shen-ge Wang et al., U.S. Appl. No. 10/159,432, filed May 30, 2002, entitled "Application of Glossmarks for Graphics Enhancement".

(Continued)

*Primary Examiner*—Scott A. Rogers
(74) *Attorney, Agent, or Firm*—Christopher D. Wait

(57) ABSTRACT

A method for reduction of differential gloss as found in halftone image hardcopy prints. The method comprises selecting either a single halftone or employing two halftones: a first halftone having a high apparent gloss characteristic; and a second halftone having a low apparent gloss characteristic. A determination is then made of which areas of the halftone image correspond to potentially high gloss and low gloss regions under normal printing conditions. An overlay of clear toner is applied to the hardcopy print of the halftone image. In one approach a single halftone is employed to control the physical area coverage of the applied clear toner layer so as to adjust the local gloss across for the determined regions and thereby balance the evenness of gloss across the entire hardcopy print of the halftone image. Greater physical area coverage is provided as controlled by the single halftone in low gloss regions, and corresponding less physical area coverage is provided in the low gloss regions. In a further approach two halftones are employed. The first halftone is directed to those portions of the overlaid clear toner determined as corresponding to potentially low gloss regions of the halftone image, and the second halftone is directed to those portions of the clear toner layer determined as overlaying potentially high gloss regions of the halftone image.

21 Claims, 3 Drawing Sheets

U.S. PATENT DOCUMENTS

| | | | |
|---|---|---|---|
| 5,087,507 A | 2/1992 | Heinzer | 428/195 |
| 5,487,567 A | 1/1996 | Volpe | 283/72 |
| 5,583,660 A | 12/1996 | Rylander | 358/3.17 |
| 5,678,133 A | 10/1997 | Siegel | 399/67 |
| 5,695,220 A | 12/1997 | Phillips | 283/91 |
| 5,710,636 A * | 1/1998 | Curry | 358/3.28 |
| 5,734,752 A | 3/1998 | Knox | 382/212 |
| 5,751,432 A * | 5/1998 | Gwaltney | 358/296 |
| 5,788,285 A | 8/1998 | Wicker | 283/93 |
| 5,853,197 A | 12/1998 | Mowry, Jr. et al. | 283/91 |
| 6,108,512 A | 8/2000 | Hanna | 399/366 |
| 6,606,168 B1 * | 8/2003 | Rylander | 358/3.09 |
| 6,714,320 B1 * | 3/2004 | Nakahara et al. | 358/3.13 |
| 6,763,121 B1 * | 7/2004 | Shaked et al. | 382/100 |
| 6,906,825 B1 * | 6/2005 | Nakahara et al. | 358/1.9 |
| 7,020,349 B2 * | 3/2006 | Brunk | 382/289 |
| 7,092,128 B2 * | 8/2006 | Wang et al. | 358/3.06 |
| 7,126,721 B2 * | 10/2006 | Wang et al. | 358/3.06 |
| 7,139,101 B2 * | 11/2006 | Loce et al. | 358/3.06 |
| 7,148,999 B2 * | 12/2006 | Xu et al. | 358/3.06 |
| 7,180,631 B2 * | 2/2007 | Ide et al. | 358/1.9 |
| 7,180,635 B2 * | 2/2007 | Wang et al. | 358/3.06 |
| 7,193,751 B2 * | 3/2007 | Wang et al. | 358/3.06 |
| 2005/0025333 A1 * | 2/2005 | Fujii et al. | 382/100 |
| 2005/0031160 A1 * | 2/2005 | Shaked et al. | 382/100 |
| 2005/0128523 A1 * | 6/2005 | Liu et al. | 358/3.06 |
| 2005/0128524 A1 * | 6/2005 | Liu et al. | 358/3.06 |
| 2005/0286083 A1 * | 12/2005 | Wang et al. | 358/3.06 |
| 2006/0072159 A1 * | 4/2006 | Eschbach et al. | 358/3.06 |
| 2006/0127117 A1 * | 6/2006 | Eschbach et al. | 399/67 |

FOREIGN PATENT DOCUMENTS

| | | |
|---|---|---|
| EP | 1705531 A1 * | 9/2006 |
| GB | 2 217 258 A | 10/1989 |

OTHER PUBLICATIONS

Shen-ge Wang et al., U.S. Appl. No. 10/159,423, filed May 30, 2002, entitled "Halftone Image Gloss Control For Glossmarks".

Beilei Xu et al., U.S. Appl. No. 10/186,065, filed Jun. 27, 2002, entitled "Variable Glossmark".

Chu-heng Liu et al., U.S. Appl. No. 60/529,187, filed Dec. 12, 2003, entitled "Enhancement of Glossmark Images at Low and High Densities".

Shen-ge Wang et al., U.S. Appl. No. 10/879,684, filed Jun. 29, 2004, entitled "Glossmark Images With Clear Toner".

* cited by examiner

REDUCTION OF DIFFERENTIAL GLOSS WITH HALFTONED CLEAR TONER

CROSS-REFERENCE TO RELATED APPLICATIONS

Cross reference is made to the following applications, the disclosures of each of which are totally incorporated by reference herein: U.S. patent application Ser. No. 10/879,684 entitled "GLOSSMARK IMAGES WITH CLEAR TONER" to inventors Shen-ge Wang, Beilei Xu, and Chu-heng Liu; U.S. patent application Ser. No. 10/876,000 entitled "REDUCTION OF DIFFERENTIAL GLOSS" to inventors Shen-ge Wang, Beilei Xu, and Chu-heng Liu; U.S. patent application Ser. No. 10/159,423 entitled "HALFTONE IMAGE GLOSS CONTROL FOR GLOSSMARKS" to inventors Shen-ge Wang, Beilei Xu, and Chu-heng Liu; U.S. patent application Ser. No. 10/159,432 entitled "APPLICATION OF GLOSSMARKS FOR GRAPHICS ENHANCEMENT" to inventors Shen-ge Wang, Beilei Xu, and Chu-heng Liu; U.S. patent application Ser. No. 10/186,065 entitled "VARIABLE GLOSSMARK" to inventors Beilei Xu, Shen-ge Wang, and Chu-heng Liu; U.S. Provisional Application No. 60/529,187 entitled "ENHANCEMENT OF GLOSSMARK IMAGES AT LOW AND HIGH DENSITIES" to inventors Shen-ge Wang, Beilei Xu, and Chu-heng Liu. The appropriate components and processes of the above co-pending applications may be selected for the disclosure of the present application in embodiments thereof.

BACKGROUND AND SUMMARY

The present disclosure relates generally to the gloss inherent in the hardcopy of image data be it pictorial or text. More particularly, this disclosure relates to digital image data and the control of differential gloss when that digital image data is printed into hardcopy. In particular the disclosure relates to the reduction of undesirable differential gloss by the employment of halftoned clear toner.

The acceptance of electrostaticgraphic print engines by the graphic arts and commercial print market has heretofore been hampered by various problems, including among them a perceived image quality issue relative to differential gloss. Typical electrostaticgraphic prints, including traditional xerographic prints, usually display high gloss in high mass regions. In the mid-tone regions the image gloss on a glossy substrate reaches a minimum. This differential gloss between high mass and mid-tone areas is objected to by some users.

A typical approach in the past has been to reduce the gloss in the high mass areas through toner and fusing optimization. However, this kind of approach also reduces the overall image gloss at the same time. This in turn upsets another group of users who find the typical glossy appearance of xerographic prints desirable.

Therefore, as discussed above, there exists a need for an arrangement and methodology which will control gloss in general and allow for reduction of undesired differential gloss employed in the application of a clear toner overlay upon a halftone image hardcopy print. Thus, it would be desirable to solve this and other deficiencies and disadvantages as discussed above, with an improved methodology for the manipulation of inherent differential gloss.

The present invention relates to a method for the reduction of differential gloss in a halftone image hardcopy output by selecting a first halftone having a high apparent gloss characteristic and a second halftone having a low apparent gloss characteristic. The first halftone is directed to at least some portion of a clear toner overlay applied upon the halftone image hardcopy output and the second halftone is directed to the remaining portion of the clear toner overlay applied on the halftone image hardcopy output.

In particular, the present invention relates to a method for the reduction of differential gloss in a halftone image hardcopy by selecting a first halftone having a high apparent gloss characteristic and a second halftone having a low apparent gloss characteristic. A determination is also made of which areas of the halftone image correspond to potentially high gloss regions under normal printing conditions. The second halftone is directed to those portions of a clear toner overlay applied upon the halftone image hardcopy output determined as corresponding to potentially high gloss regions of the halftone image. The first halftone is directed to the remaining portions of the clear toner overlay applied upon the halftone image hardcopy output.

The present invention also relates to a method for the reduction of differential gloss in a halftone image hardcopy by selecting a first halftone having a high apparent gloss characteristic and a second halftone having a low apparent gloss characteristic. A determination is made as to which areas of the halftone image correspond to potentially high gloss regions under normal printing conditions and which areas of the halftone image correspond to potentially low gloss regions under normal printing conditions. The first halftone is directed to those portions of a clear toner overlay applied upon the halftone image hardcopy output as determined as corresponding to potentially low gloss regions and the second halftone to those portions of a clear toner overlay applied upon the halftone image hardcopy output determined as corresponding to potentially high gloss regions of the halftone image.

The present invention further relates to a method for the reduction of differential gloss in a halftone image hardcopy by selecting a first halftone having a high apparent gloss characteristic and a second halftone having a low apparent gloss characteristic. A median average gloss level is determined as existent across the halftone image. Then those image areas in the halftone image which are above the median gloss level are determined as well. The second halftone is then directed to those portions of a clear toner overlay being applied upon the halftone image hardcopy output determined as corresponding to areas above the determined median gloss level of the halftone image. The first halftone being directing to the remaining portions of the clear toner overlay applied upon the halftone image hardcopy output.

The present invention further relates to a method for the reduction of differential gloss in a halftone image hardcopy output by selecting a single halftone providing at least two or more levels of physical area coverage and determining which areas of the halftone image correspond to regions of high and regions of low gloss under normal printing conditions. Then while applying a clear toner layer employing the selected single halftone to the printed hardcopy output of the halftone image, the local amount of applied clear toner is controlled in the determined areas by employing the correct level of the at least two or more levels of physical area coverage as provided by the selected single halftone.

DETAILED DESCRIPTION

The disclosure provided herein is motivated by the recent discovery that image gloss is strongly affected by halftone structures. We have also determined that image density and regular perception can remain intact while image gloss is varied through the changing of halftone structures. With this new understanding, there is described herein how to use different halftone structures to enhance the gloss of low gloss regions and/or to reduce the gloss of high gloss regions to decrease the differential gloss that is objectionable some users. By proper utilization of the perceived different gloss levels inherent between various halftone structures, the desired manipulation of perceived gloss and the reduction of differential gloss may be achieved without the need for overall image gloss reduction or employment of special toners or fusing optimization. The determination of which image areas receive which halftone structures may be selected as based upon local density alone as an automatic image enhancement feature or by way of various segmentation techniques alone or in combination.

Figure 1:
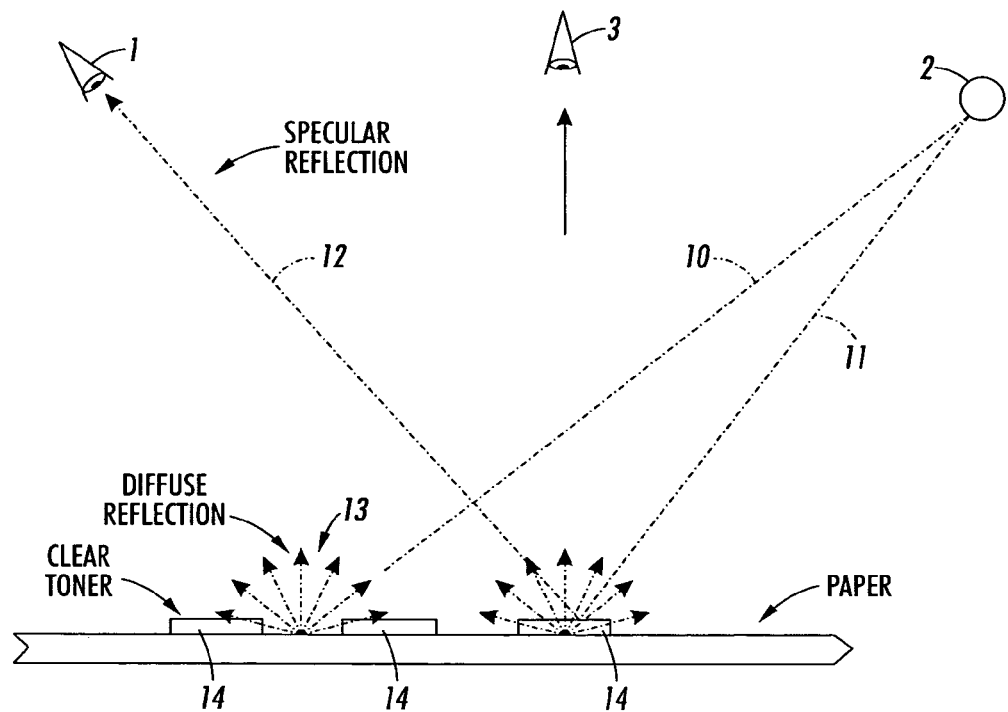
FIG. 1 shows how the human eye can detect a large difference between the glossy portions of the page but a scanner detector cannot.

FIG. 1 shows how the human eye 1 can read gloss upon the page and a scanner cannot. Three glossy areas 14 are shown. One ray of light 10 from the light source 2 hits the paper at a point where there is no gloss toner 14, and the reflected light 13 is diffused so that there is only a small amount of light in all directions, including the direction toward the human eye 1. Another ray of light 11 of equal intensity touches the paper at a point where there is gloss toner 14. Here, there is a large amount of reflected light 12 in the indicated direction. If the human eye 1 is positioned as shown, a large difference between glossy and non-glossy toner areas is readily observable by the human eye 1. However, the scanner 3 reads incident light at right angles to the paper. In this case, there is only a small amount of diffused light coming from both the glossy and non-glossy dots, and the scanner can not detect a difference. This is one manner for creating a gloss image which cannot be scanned by conventional copiers and scanners.

Figure 2:
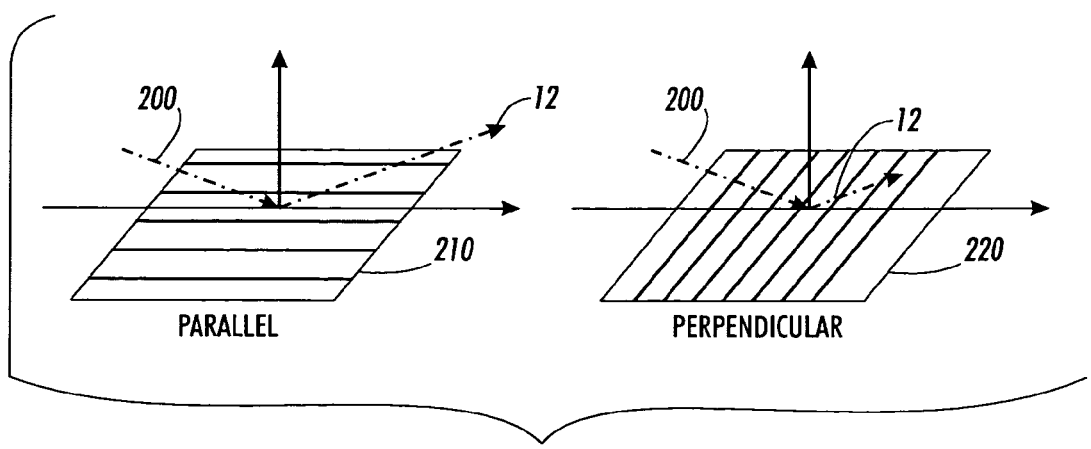
FIG. 2 depicts a differential gloss found in simple line-screen halftones.

Heretofore, there has been little appreciation for the fact that the inherent reflective and diffusive characteristics of halftones may be manipulated to be directive of incident light as about an azimuth by use of a halftone structure which is anisotropic in nature. A mirror is equally reflective regardless of the azimuth of the light source relative to the plane of the mirror. Similarly, an ordinary blank paper is equally reflective and diffusive regardless of the azimuth of the light source. However, printed matter can and will often display differing reflective and diffusive characteristics depending upon the azimuth of origin for a light source relative to the structural orientation of the halftone. Such reflective characteristics when maximized are exhibited in a halftone with a structure which is anisotropic in nature. In other words, the indicatrix used to express the light scattered or reflected from a halftone dot will maximally vary depending upon the halftone dot's azimuth orientation to the light source when that halftone has an anisotropic structure. FIG. 2 provides an example of what is meant by anisotropic structure.

In FIG. 2, a simple line-screen halftone of anisotropic nature is presented in two orientations relative to impinging incident light 200, a parallel orientation 210, and a perpendicular orientation 220. Both halftone dot orientations are selected to be similar in density so that the diffuse light and incident light at orthogonal angles to the paper are equal. In this way, the light which is available to scanner 3 or to the human eye from straight on is the same. However, the specular reflected light 12 is considerably greater for the anisotropic parallel orientation 210. If as printed, a mass of the 210 parallel orientation halftones are butted directly adjacent to a mass of 220 perpendicular orientation halftones, there will be a difference in reflected light between them, which when viewed from an angle will be perceived as a shift in gloss differential or a glossmark image. As is shown here in FIG. 2, the perceptibility of this gloss differential will be maximized when the halftone anisotropic orientations are 90 degrees apart, as opposed to when they are substantially parallel where the gloss differential will be minimized.

Figure 3:
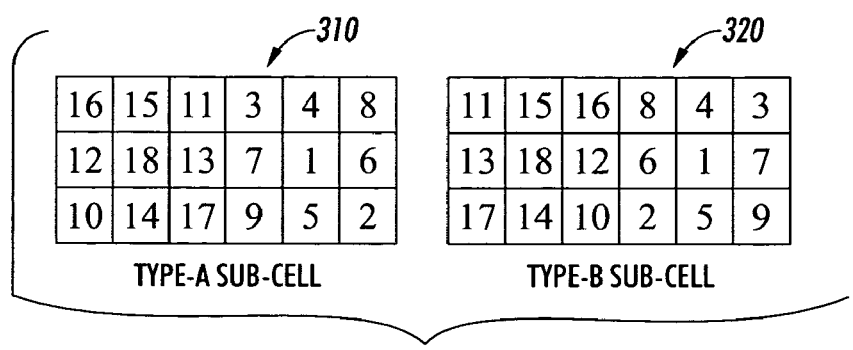
FIG. 3 shows two 3×6 halftone patterns suitable in anisotropic structure to produce discernable gloss differential for practicing the present invention.
Figure 4:
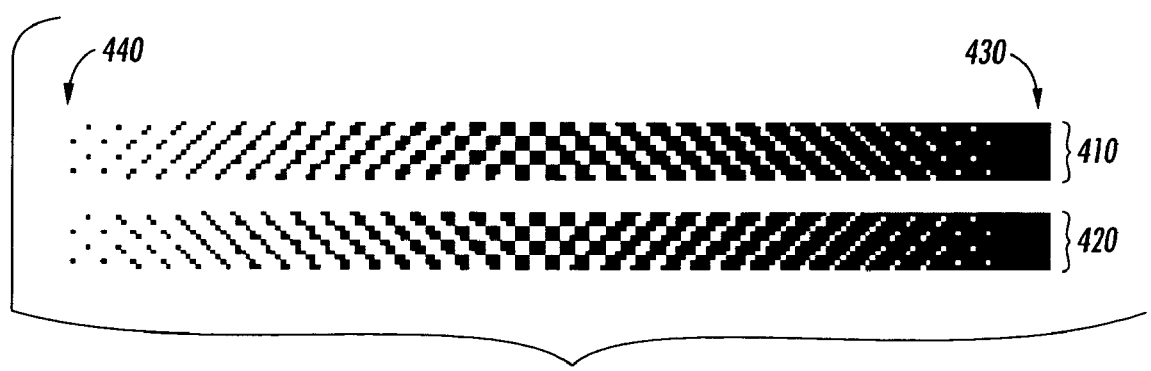
FIG. 4 is a density sweep of the two halftone patterns of FIG. 3.

FIG. 3 shows example halftone cells suitable for a skilled practitioner to employ in an embodiment employing the teachings of the present invention. They are but one useful example as will be evident to those skilled in the art. Each halftone cell is comprised as a three by six pixel array. The turn on/off sequence is numerically indicated. Note the diagonal orientation of the pixel numbering. The type-A sub-cell 310 and type-B sub-cell 320 both have a 45 degree orientation, one to the right and the other to the left. This orientation can be clearly seen in the density sweeps 410 and 420 of FIG. 4. To maximize the perceptibility of the gloss differential, the orientations of sub-cells type-A and type-B are arranged 90 degrees apart one from the other.

Figure 5:
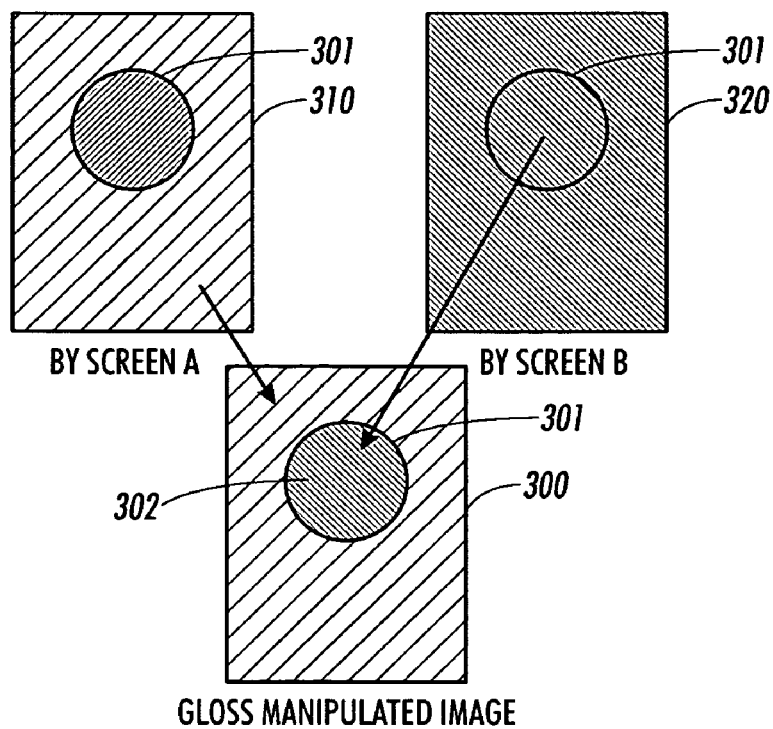
FIG. 5 depicts a patchwork alternating of the two halftone patterns of FIG. 3 so as to achieve a glossmark.

FIG. 5 depicts a glossmark image 500 achievable using halftone cells as described above. Screen-A 510 uses one halftone cell type and screen-B 520 uses the other. The circle 501 is provided as a visual aid across the image screens 500, 510 and 520. The desired glossmark image here is for a sphere 502 to be perceived in the midst of image 500. Screen-A 510 provides the field of right diagonal oriented anisotropic halftones and screen 520 provides the spherical area of left diagonal oriented anisotropic halftone cells. In this manner, a selection of the two screen types are patch-worked together to create the glossmark image 500.

Figure 6:
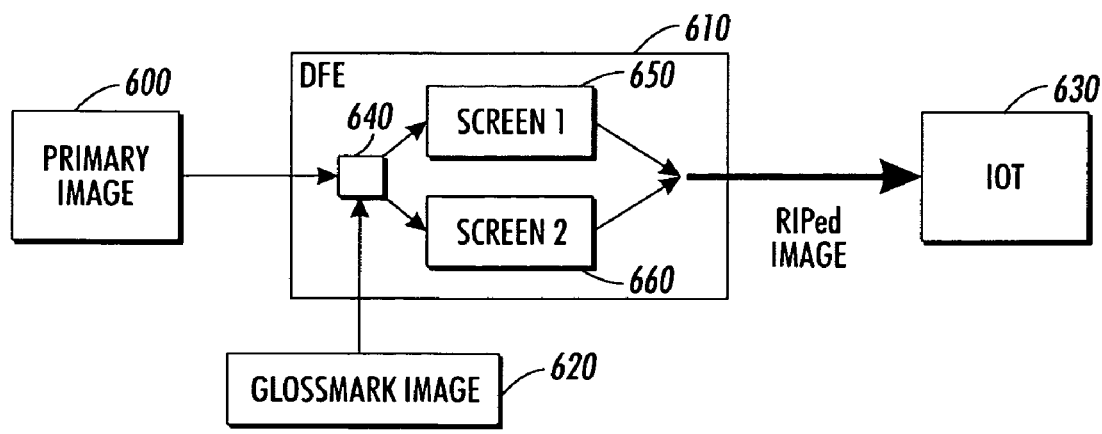
FIG. 6 shows one embodiment for achieving the image directed alternation of the halftone patterns for glossmarks as depicted in FIG. 5, utilizing the halftone patterns of FIG. 3.

An another approach for the assembly of a glossmark image is diagramed in FIG. 6. Here, the primary image 600 is received as input data to the digital front-end (DFE) 610 as is normal. However, a desired glossmark image 620 is also received as input data to the DFE 610 as well. The processed image as sent to the image output terminal (IOT) 630 is gray-scaled, the halftone density being driven by the primary image 600 data as is normal. However, the halftone type selection is driven by the intended glossmark image data 620 as input to multiplexer switch 640. The intended glossmark image data 620 will serve to direct a portion of the primary image 600 to use a first anisotropic structured halftone while directing an alternative halftone to be used for the remainder of primary image 600. As will be understood by those skilled in the art, the intended glossmark image data 620 may be flattened into simple zero and one pixel data representations if needed in the DFE 610. This pattern of zero and ones are then used to toggle the multiplexer 640 to one halftone anisotropic structure orientation type or the other. Multiplexer 640 therefore toggles between either screen 1 type halftone 650 or screen 2 halftone type 660, as dictated by the desired glossmark data 620, to produce the composite result of raster input processed (RIP) image data as passed to the IOT 630. In this way, a superimposition of a pattern 620 is imbedded into the primary image 600 which can only be perceived as a gloss differential glossmark picture.

By alternating between two halftone types, carefully selected such that each has identical matching density characteristics while displaying distinctly different anisotropic structure orientations will enable the super imposition of a glossmark image without the need for special toners or paper. This manipulation of gloss differentials will, of course, be best utilized with toner/ink and substrate systems which themselves best display inherent gloss characteristics. Examples of such systems comprise electrostaticgraphic and quality ink-jet systems. While wax based systems typically have less inherent gloss, they may well prove amendable to techniques which increase their inherent gloss. In just such a scenario, the teachings herein are anticipated to apply such wax based systems as well. It will be appreciated by those skilled in the art that these teachings will apply to both monochromatic, black and white, as well as color images and upon plain paper, glossy paper or transparencies. Those skilled in the art will also understand that this manipulation of inherent anisotropic gloss differential standing alone will be weak where either there is a solid black area (solid toner/ink) or a white and therefore toner-less/ink-less area. That is because these areas will not best exhibit the anisotropic structures of the selected halftones.

As discussed above the rendering of a desired glossmark image can only be made effective in those halftone regions in the print of a primary image where the halftone structures in the primary image can be changed significantly without visual density/color change. In solid coverage (100%) 430 and highlight (low density) 440 (see FIG. 4) regions, the glossmark print contrast is weak or near zero. In these regions, one approach as previously taught by U.S. Provisional Application No. 60/529,187 entitled "ENHANCEMENT OF GLOSSMARK IMAGES AT LOW AND HIGH DENSITIES" is to employ a clear toner which is superimposed as proscribed by desired glossmark image 620 to create clear toner structures without affecting the visual density/color of the existing primary images. The technique in one embodiment comprises application of the clear toner method of U.S. Pat. No. 6,108,512 incorporated above, in combination with the anisotropic halftone dot manipulation of differential gloss as taught above and in related patent application Ser. No. 10/159,423 referenced above. The clear toner is applied so as to be coincident with just one of the selected anisotropic halftone screens. For example, in FIG. 5, the clear toner may be applied to cover and be coincident with the edges of circle 501 in image 500. This technique is very effectively used to compliment and enhance the glossmark print to create a more nearly uniform differential gloss contrast across the whole of primary image 600 density/color ranges. In a further alternative it may be superimposed in a manner proscribed by an alternative image mark other than, and even distinctly different from, the desired glossmark image 620 to create artistic effects or enhancements to the final hardcopy print.

However, the additional teaching as provided herein is that clear toner may have Glossmark images embedded therein. As described above, the teaching of providing Glossmark images involves the manipulation by halftone selection of the microscopic surface structure, or the surface relief realized in a printed image. Experimentally, it has been observed that a light color like yellow, works as well as dark colors, e.g., black, for embedding and realizing a Glossmark image. Indeed it has been found that the surface relief from certain specified halftone structures has a similar structure, no matter what colorant is printed. This has been found to include clear toners (transparent or colorless toner and inks). Thus, a clear toner layer may be similarly provided with a differential gloss pattern as described in related patent application Ser. No. 10/159,423, if the same halftone pattern manipulation as was described for use upon a color toner is employed when the clear toner is applied to a substrate, either prior to, or subsequent to the depositing of color toners. Indeed, one benefit of Glossmark techniques applied to clear toners particularly when applied prior to the application of color and black image toners, is that the planarity is improved over the more simplistic "clear toner/no clear toner" application approach employed as described in U.S. Provisional Application No. 60/529,187 which is inclined to telegraph a embossed effect through subsequently applied toner layers. This embossed effect may, or may not, be a desirable effect depending upon the customer desires and requirements.

As will be now be evident to one skilled in the art, an independent clear toner Glossmark image can thus be added to a substrate or document, either in a separate independent printing process or as printed contemporaneously with the primary content of a given document page. As such, one approach is to employ an additional toner station (a 5th station beyond CYMK) as is presently found in production machines that allow for highlight or custom colors. Thus, a clear toner image can be processed by two matched Glossmark halftone screens to embed another independent image, a Glossmark image in the clear toner layer. Since the primary content of the document can be anything, including a color image with embedded Glossmark images, there is now enabled by this technique the creation of multiple layered gloss images within a single print. One Glossmark corresponding to screen angle modulation of the color toner mass coverage (primary) and another corresponding to screen angle modulation of a subsequently applied clear toner, thus rendering multiple layered Glossmark images. There are many possible combinations of these images for different applications, especially for security printing purposes.

The technique is effective in embedding Glossmark images in blank areas. Even though clear toner is transparent, it is not difficult to see the gloss image created with the printed clear toner patterns, mainly due to the gloss difference between the paper and the toner surface. However, if the clear toner is applied only to a blank area surrounded by other colors, such as a circle drawn in a color outline, it will be very difficult to notice the existence of the clear toner. Embedding Glossmark images into such clear toner area will create very special visual effects from the graphics or images printed. Also, it will provide a new way to embed Glossmark images in certain applications, such as found in many of the line arts, which are drawn in solid coverage (100%) black 430 or other colors and are thus not suitable where the Glossmark differential gloss print contrast is weak or near zero as explained above.

For the optimal perception of a Glossmark image it is necessary not only to control of the fusion process and the choice of materials paper and toner, but to control the amount of toner put on a substrate also. Too little toner will fail to yield sufficient pile-up for the required surface profile, while too much toner will saturate and flatten the surface and thus reduce the possible directional differential gloss for viewing Glossmark images. Adding halftone patterned clear toner to the light areas as well as any blank areas in the desired print image, can be employed to enhance the appearance of Glossmark images in these toner pile extremes. One approach for improving the perception of a Glossmark in these toner pile extremes for a given print, the amount of patterned clear toner added to the image in these areas is determined by a calibration process for the optimal perception visualization of Glossmark images. For each color combination, say CMYK, there is a certain amount of the clear toner, $T_{CMYK}$, that can be added to the print to achieve an optimal perception of Glossmark images. Therefore, for any given image, CMYK(x, y), there is a corresponding clear toner image, $T_{CMYK}$ (x, y), that can be added to the print for the Glossmark enhancement purpose. The clear toner image, $T_{CMYK}$ (x, y), should be processed by the same halftone method, as proposed previously, but now using two matched halftone screens as were used for embedding the Glossmark image into the primary image. Please note that for the purposes of this specification that "K" or "black" is considered to be a color.

Another application for the teaching provided herein is in the reduction of undesirable differential gloss. That is, to use halftoned or Glossmark imaged clear toner as an additional layer to reduce the overall perceived gloss difference in a given print. Differential gloss exists between the paper and the toner surface, as well as two surfaces with different colors. Adding halftone patterned clear toner suitably imaged to a given printed image will alter the final print gloss appearance and can reduce undesirable differential gloss for a given print. In one embodiment the use of a stochastic screen is applied to the clear toner for a good isotropic gloss measure and minimally noticeable clear toner appearance. A calibration process is conducted to find the influence upon the final print gloss by the amount and pattern of a single halftone or a Glossmark image pattern applied to the clear toner for each of the different colors. Therefore, for any given image, CMYK(x,y), there is a corresponding clear toner image, $T_{CMYK}$ (x, y), that can be added to the print for an optimal reduction of overall differential gloss.

In one possible embodiment for use in the relatively simple scenario of monochrome printing, the average mass per unit area of different image areas is determined by the density of a single separation. A clear toner layer is applied over the hardcopy print. To reduce the differential gloss of the print, the gloss enhancing/reduction functionality of the halftone scheme as applied to an overlaying clear toner area is tied to the underlying image density/color. In the high mass/density regions, halftone structures that will yield low gloss in the clear toner are employed. In the mid-tone regions, the digital imaging system is directed to apply gloss enhancing halftone structures to the clear toner over those image regions. In this way the differential in gloss between the two density regions is reduced, minimized, or even eliminated. Furthermore, the avoidance of halftone structures that provide a strong anisotropic gloss characteristic, (and taught as desirable in U.S. patent application Ser. No. 10/159,423 "HALFTONE IMAGE GLOSS CONTROL FOR GLOSSMARKS") is also exemplary in the selection of suitable halftones employed in the clear toner overlay. Indeed if the right halftone structure is selected the requirement for two independent halftone screens may be reduced down to needing only one single halftone screen type, but for which two (or more) halftone levels of physical area coverage are employed attributable to that single halftone screen type.

In more complicated situations such as color image rendering, one typical process to reduce the differential gloss of a printed image consists of the following two steps:
1) IMAGE SEGMENTATION: based on the digital content of the image, determine the potential high gloss and/or low gloss regions under a normal printing condition;
2) DIFFERENTIAL GLOSS REDUCTION: apply gloss-enhancing halftone screen(s) to the clear toner overlaying low gloss region(s) or/and apply gloss reduction halftone screen(s) to the clear toner overlaying the high gloss region(s).

Under normal printing conditions, process black typically has the highest gloss within an image. In one embodiment, the high mass process black region is segmented from the rest of the image. In this example, the segmentation criteria is K>70%, C,M,Y>40% in this embodiment. However, It should be understood that this segmentation criteria can be different for different printers and can even be different for different image contents. Once the segmentation map is obtained, there is employed in the high mass segments, a 141 lpi cluster dot screen set (although any lpi from 100-250 may be employed) to the overlying clear toner while a stochastic screen is applied to the other clear toner regions. The gloss of the high mass regions (for example the hair in one image) may thus be reduced. Differential gloss of the image may be significantly reduced via this example halftone structure manipulation as applied to a clear toner overlay.

In another scenario, some lesser, more median level of overall gloss as found across the entire page image may be identified as more desirable and the above described techniques applied to reduce the inherent hardcopy gloss in those areas which exceed that median. That would mean that those identified image areas regions with high inherent gloss would receive an overlay of clear toner suitably halftoned to reduce the perceivable gloss and thereby reduce the deferential gloss that might otherwise be existent in the hardcopy print. Thus the overall hardcopy gloss is suitably reduced to achieve a more uniform finished result. As will know doubt be evident to those skilled in the art, the exact levels, combinations and areas of selection for application of this technique as taught above will be empirical as dependent upon the particular printing system, toners employed, substrates applied to, and the intrinsic gloss inherent in their various combinations.

In yet another approach, a single halftone is employed to control the physical area coverage of the applied clear toner layer, so as to adjust the local gloss across for the determined regions and thereby balance the evenness of gloss across the entire hardcopy print of the halftone image. Greater physical area coverage is provided as controlled by the single halftone in low gloss regions, and correspondingly less physical area coverage is provided for in the high gloss regions. This control, as will be well understood by those skilled in the art, is provided simply by adjusting the number of "on" pixels in the single halftone in a manner relative to the underlying color toner image and the determined local inherent gloss found there. The halftone dot type employed and the correct corresponding physical area coverage for that single halftone dot is dependent upon the system, toners, inks, substrate, and general environment. But fundamentally for a print system having high inherent gloss the correct corresponding physical area coverage for an area of blank space no toner is going to be correspondingly high. Conversely, for more fully saturated image areas the correct corresponding physical area coverage is going to be something correspondingly less.

While the embodiments disclosed herein are preferred, it will be appreciated from this teaching that various alternative modifications, variations or improvements therein may be made by those skilled in the art. For example, it will be understood by those skilled in the art that the teachings provided herein may be applicable to many types of halftone cell types and arrangements including selecting more than two different halftone structures, as well being applicable to many types of toner/ink and substrate-types. All such variants are intended to be encompassed by the claims which follow. These claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for the reduction of differential gloss in a halftone image hardcopy output comprising:
    selecting a first halftone having a high apparent gloss characteristic;
    selecting a second halftone having a low apparent gloss characteristic;
    directing the first halftone to at least some portion of a clear toner overlay applied upon the halftone image hardcopy output; and,
    directing the second halftone to the remaining portion of the clear toner overlay applied upon the halftone image hardcopy output.

2. The method of claim 1 wherein the first halftone is a stochastic halftone type.

3. The method of claim 1 wherein the second halftone is a cluster dot halftone type.

4. The method of claim 1 wherein the second halftone is a 100~250 lines-per-inch cluster dot screen halftone type.

5. The method of claim 1 wherein the second halftone is a line screen halftone type.

6. A method for the reduction of differential gloss in a halftone image hardcopy output comprising:
    selecting a first halftone having a high apparent gloss characteristic;
    selecting a second halftone having a low apparent gloss characteristic;
    determining which areas of the halftone image correspond to potentially high gloss regions under normal printing conditions;
    directing the second halftone to those portions of a clear toner overlay applied upon the halftone image hardcopy output corresponding to potentially high gloss regions of the halftone image; and,
    directing the first halftone to the remaining portions of the clear toner overlay applied upon the halftone image hardcopy output.

7. The method of claim 6 wherein the first halftone is a stochastic halftone type.

8. The method of claim 6 wherein the second halftone is a cluster dot halftone type.

9. The method of claim 6 wherein the second halftone is a 100~250 lines-per-inch cluster dot screen halftone type.

10. The method of claim 6 wherein the second halftone is a line screen halftone type.

11. The method of claim 6 wherein the determining step is based upon density.

12. The method of claim 6 wherein the determining step is based upon segmentation.

13. A method for the reduction of differential gloss in a halftone image hardcopy output comprising:
    selecting a first halftone having a high apparent gloss characteristic;
    selecting a second halftone having a low apparent gloss characteristic;
    determining which areas of the halftone image correspond to potentially high gloss regions under normal printing conditions;
    determining which areas of the halftone image correspond to potentially low gloss regions under normal printing conditions;
    directing the first halftone to those portions of a clear toner overlay applied upon the halftone image hardcopy output determined as corresponding to potentially low gloss regions; and,
    directing the second halftone to those portions of a clear toner overlay applied upon the halftone image hardcopy output determined as corresponding to potentially high gloss regions of the halftone image.

14. The method of claim 13 wherein the first halftone is a stochastic halftone type.

15. The method of claim 13 wherein the second halftone is a cluster dot halftone type.

16. The method of claim 13 wherein the second halftone is a 100~250 lines-per-inch cluster dot screen halftone type.

17. The method of claim 13 wherein the second halftone is a line screen halftone type.

18. The method of claim 13 wherein the determining step is based upon density.

19. The method of claim 13 wherein the determining step is based upon segmentation.

20. A method for the reduction of differential gloss in a halftone image hardcopy output comprising:
    selecting a first halftone having a high apparent gloss characteristic;
    selecting a second halftone having a low apparent gloss characteristic;
    determining a median average gloss level as existent across the halftone image;
    determining those image areas in the halftone image which are above the determined median gloss level;
    directing the second halftone to those portions of a clear toner overlay applied upon the halftone image hardcopy output that are determined as corresponding areas above the determined median gloss level of the halftone image; and,
    directing the first halftone to the remaining portions of the clear toner overlay applied upon the halftone image hardcopy output.

21. A method for the reduction of differential gloss in a halftone image hardcopy output comprising:
    selecting a single halftone providing at least two or more levels of physical area coverage;
    determining which areas of the halftone image correspond to regions of high and regions of low gloss under normal printing conditions;
    applying a clear toner layer employing the selected single halftone, to the printed hardcopy output of the halftone image; and
    controlling the local amount of applied clear toner in the determined areas by employing the correct level of the at least two or more levels of physical area coverage as provided by the selected single halftone.

* * * * *